US012565592B2

(12) United States Patent
Hänle et al.

(10) Patent No.: US 12,565,592 B2
(45) Date of Patent: Mar. 3, 2026

(54) AQUEOUS INKJET INK FOR NON-ABSORBENT PRINTING SUBSTRATES AND PRINTING PROCESS

(71) Applicant: Heidelberger Druckmaschinen AG, Heidelberg (DE)

(72) Inventors: Johannes Hänle, Wiesloch (DE); Florian Hinderer, Esslingen (DE); Ina Rianasari, Heidelberg (DE); Susanne Ruppel, Darmstadt (DE); Thomas Paul, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 469 days.

(21) Appl. No.: 18/154,058

(22) Filed: Jan. 13, 2023

(65) Prior Publication Data

US 2023/0227678 A1     Jul. 20, 2023

(30) Foreign Application Priority Data

Jan. 18, 2022     (DE) ..................... 10 2022 101 034.1

(51) Int. Cl.
| | |
|---|---|
| *C09D 11/322* | (2014.01) |
| *B41J 2/21* | (2006.01) |
| *B41J 11/00* | (2006.01) |
| *B41M 5/00* | (2006.01) |
| *B41M 7/00* | (2006.01) |
| *C09D 11/033* | (2014.01) |
| *C09D 11/037* | (2014.01) |
| *C09D 11/102* | (2014.01) |
| *C09D 11/30* | (2014.01) |
| *C09D 11/326* | (2014.01) |
| *C09D 11/38* | (2014.01) |
| *C09D 11/40* | (2014.01) |

(52) U.S. Cl.
CPC ........... *C09D 11/322* (2013.01); *B41J 2/2107* (2013.01); *B41J 11/00214* (2021.01); *B41M 5/0023* (2013.01); *B41M 5/0047* (2013.01); *B41M 7/009* (2013.01); *C09D 11/033* (2013.01); *C09D 11/037* (2013.01); *C09D 11/102* (2013.01); *C09D 11/30* (2013.01); *C09D 11/326* (2013.01); *C09D 11/38* (2013.01); *C09D 11/40* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623;

B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 9,446,604 B2 | 9/2016 | Sarkisian et al. | |
| 2007/0060670 A1 | 3/2007 | Ellis | |
| 2011/0043578 A1* | 2/2011 | Tojo ..................... | B41M 5/0023 347/102 |
| 2011/0184108 A1* | 7/2011 | Okuda ................... | C09D 11/10 524/507 |
| 2013/0249996 A1* | 9/2013 | Saito ..................... | B41J 2/2114 524/429 |
| 2017/0145232 A1* | 5/2017 | Bauer ................... | C09D 11/40 |
| 2017/0321084 A1 | 11/2017 | Huang et al. | |
| 2017/0362456 A1* | 12/2017 | Bruinsma ............ | C09D 11/322 |
| 2019/0264057 A1* | 8/2019 | Ohta .................... | B41M 5/0064 |
| 2020/0101781 A1* | 4/2020 | Okuda ................. | C09D 11/322 |
| 2021/0246327 A1 | 8/2021 | Zheng et al. | |

(Continued)

FOREIGN PATENT DOCUMENTS

| | | |
|---|---|---|
| CN | 113302243 A | 8/2021 |
| EP | 2718110 A1 | 4/2014 |

(Continued)

*Primary Examiner* — Manish S Shah
(74) *Attorney, Agent, or Firm* — Laurence A. Greenberg; Werner H. Stemer; Ralph E. Locher

(57) ABSTRACT

An inkjet ink includes pigment, dispersing agent, fixing agent, binder and water. The binder is selected from polyurethanes of a low acid value, the dispersing agent has a low acid value, and the fixing agent is a multivalent calcium salt used in a low concentration. The inkjet ink is easy to apply by using commercial inkjet printing presses, has high storage stability, adheres to surfaces that do not absorb water, exhibits high resistance to wiping and is very advantageously capable of being overprinted by other water-based inkjet inks. A printing process is also provided.

15 Claims, No Drawings

(56)  References Cited

U.S. PATENT DOCUMENTS

2021/0371687  A1 *  12/2021  Ishida  .................... B41J 2/2114
2022/0119660  A1     4/2022  Fujita et al.

FOREIGN PATENT DOCUMENTS

EP          3798276  A1     3/2021
WO       2007035505  A1     3/2007
WO       2020046341  A1     3/2020

* cited by examiner

AQUEOUS INKJET INK FOR NON-ABSORBENT PRINTING SUBSTRATES AND PRINTING PROCESS

CROSS-REFERENCE TO RELATED APPLICATION

This application claims the priority, under 35 U.S.C. § 119, of German Patent Application DE 10 2022 101 034.1, filed Jan. 18, 2022; the prior application is herewith incorporated by reference in its entirety.

FIELD AND BACKGROUND OF THE INVENTION

The invention relates to aqueous inkjet ink and to a method which utilizes the aqueous inkjet ink.

Inkjet printing, where one or more inkjet printing heads with a plurality of inkjet nozzles apply inkjet ink to printing substrates in a controlled manner, is a known process in the printing industry. Once the drying process in the printing machine has been completed, the printed image is output. Inkjet printing processes may use UV inkjet inks and aqueous inkjet inks. UV inkjet inks frequently dry under the influence of UV radiation whereas aqueous inkjet inks are dried by being heated, usually by the application of IR radiation.

Due to their characteristics, some printing substrates yield unsatisfactory results when aqueous inkjet inks are applied. That applies first and foremost to printing substrates which have a low capacity of absorbing such inkjet inks. When aqueous inks are printed directly onto plastic foil made of polyethylene, for instance, the resultant printed image is prone to smearing. A known measure to avoid such an unsatisfactory result is to apply primer to the printing substrate before the actual inkjet printing process. The primer makes it possible in a subsequent process to print a flawless printed image using conventional aqueous inkjet ink.

In many cases, the print is not monochrome, but polychrome, i.e. it includes multiple colors, for instance in the CMYK color space. A problem in that context is that after the drying process, the aqueous ink that is utilized does not exhibit satisfactory ink fixing properties. That means that when further aqueous inkjet ink is printed on top of dried aqueous inkjet ink, the ink that has been applied last may bleed and thus the printed image may be flawed. The commercial requirements that the printed image has to meet in terms of durability may likewise be affected.

U.S. Publication No. 2017/0321084 A1 describes aqueous primers which are intended to provide an improved printed image and better durability of inkjet prints on smooth paper substrates. The aqueous primers include a pigment, a multivalent salt, and a polyurethane dispersion as a binder. The document does not describe applying the primers in an inkjet printing process.

European Application EP 2 718 110 A1, corresponding to U.S. Pat. No. 9,446,604, describes a white pre-treatment composition for inkjet printing. The composition includes binders, polyvalent metal salt, latex resin, and titanium dioxide particles.

European Application EP 3 798 276 A1 describes an aqueous varnish composition for creating a layer of varnish in an inkjet printing process. The aqueous varnish composition includes a binder with a polyurethane.

International Publication WO 2020/046341 A1, corresponding to U.S. Publication No. 2021/0246327, describes primers for inkjet printing. The primers include a multivalent metal salt, a cationic polymer, and water. In addition, the document describes inkjet inks including a pigment, a polyurethane-based binder, and water.

International Publication WO 2007/035505 A1, corresponding to U.S. Publication No. 2007/0060670, describes aqueous inkjet inks including titanium dioxide and polyurethane binders. The aqueous inkjet inks are said to be especially suitable for printing on textiles.

The primers and inkjet inks known in the art have disadvantages. On one hand, some of them may not be applied to printing substrates by using inkjet printing processes. On the other hand, some of the described primers and inkjet inks are not suitable for printing on printing substrates of low absorption capacities. Moreover, printing further aqueous inkjet inks onto some of the described primers and inkjet inks after drying results in flawed printed images. If that is done anyway, the subsequently applied ink may bleed and a printed image that is not resistant to wiping may be the result. Some of the compositions described in the prior art are not stable if they are stored over an extended period, especially at the higher temperatures that occur in inkjet printing machines.

There is continued demand for aqueous inkjet inks which avoid the aforementioned disadvantages. Desirable properties which such aqueous inkjet inks should have include being applicable to non-absorbent printing substrates in an inkjet printing process and providing satisfactory results if further aqueous inks are applied on top. The aqueous inkjet inks should also remain stable even when stored over an extended period of time at increased temperatures without losing their advantageous properties.

SUMMARY OF THE INVENTION

It is accordingly an object of the invention to provide an aqueous inkjet ink for non-absorbent printing substrates and a printing process, which overcome the hereinafore-mentioned disadvantages of the heretofore-known inks and processes of this general type.

Surprisingly, it has been found that water-based compositions which include a low concentration of a calcium salt as a fixing agent, a polyurethane binder of a low acid value, a dispersing agent of a low acid value, and a pigment are compatible with conventional inkjet printing heads and may be applied in an inkjet printing process, resulting in ink films that adhere well even to printing substrates of low water-absorbing capacity and may advantageously be overprinted. Such compositions result in high-quality printed images which are resistant to wiping. Such compositions are stable even if they are exposed to increased temperatures over an extended period of time.

With the foregoing and other objects in view there is provided, in accordance with a first aspect of the present invention, an inkjet ink comprising the following components:
  a) at least one pigment,
  b) at least one dispersing agent of an acid value below 20 mg KOH/g in terms of the total amount of dispersing agent b),
  c) at least one fixing agent selected from among the group of multivalent calcium salts, the amount of the at least one fixing agent ranging between 0.05 and 5 percent by weight in terms of the total amount of inkjet ink,
  d) at least one binder selected from among polyurethanes with an acid value below 20 mg KOH/g in terms of the entire binder d) and e) water, the inkjet ink having a viscosity of less than 30 mPa·s as measured by a cone plate viscometer at 25° C.

In a preferred embodiment, the inkjet ink of the invention has a viscosity of less than 20 mPa·s as measured by a cone plate viscometer at 25° C. and in a particularly preferred embodiment it has a viscosity of less than 10 mPa·s as measured by a cone plate viscometer at 25° C.

In accordance with the invention, a polyurethane is used as the binder d). The binder d) is necessary to achieve sufficient adhesion of the inkjet ink of the invention on non-absorbent printing substrates.

The acid value of the at least one binder d) is less than 20 m KOH/g in terms of the entire amount of binder d). In a preferred embodiment, the acid value of the at least one binder d) is less than 10 mg KOH/g in terms of the entire amount of binder d). The acid value indicates the mass of potassium hydroxide in milligrams required to neutralize one gram of the corresponding dispersing agent or binder. How to determine the acid value is described, for instance, in German Standard DIN ISO 2114 defined by the German Institute for Standardization.

In a preferred embodiment, the at least one binder d) is selected from among non-ionic and anionic polyurethanes, preferably from among non-ionic and weakly anionic polyurethanes. A person skilled in the art will basically be familiar with the differentiation between non-ionic and anionic or weakly anionic polyurethanes. Non-ionic polyurethanes are polyurethanes without ionic groups. If the polymeric backbone of the polyurethane has side chains with anionic groups such as carboxyl groups or sulfonate groups, in general it is an anionic polyurethane as long as the polymer does not contain any cationic groups or as long as it contains only a few cationic groups. The side chains may also include cationic groups such as amino groups, which may at least partly neutralize the anionic groups. The acid value may indicate the degree of the anionic character of the polymer.

A person skilled in the art will be familiar with polyurethanes. They are created by polycondensation of one or more polyisocyanates, usually diisocyanates, and one or more polyols, usually diols. Examples of polyisocyanates include aromatic, araliphatic, aliphatic, or cycloaliphatic diisocyanates such as xylylene diisocyanate, tetramethylene diisocyanate, 1,12-diisocyanatododecane, hexamethylene diisocyanate, 2,3,3-trimethylhexamethylene diisocyanate, 1,4-cyclohexylene diisocyanate, dicyclohexylmethane 4,4'-diisocyanate, 4,4'-dicyclohexyl diisocyanate, 1,4-phenylene diisocyanate, toluene 2,6-diisocyanate, toluene 2,4-diisocyanate, 1,5-naphthylene diisocyanate, 2,4'-diphenylmethane diisocyanate, 4,4'-diphenylmethane diisocyanate, or 4,4'-diphenyldimethylmethane diisocyanate. Examples of polyols include alkanediols such as ethylene glycol, polyethylene glycol, propylene glycol, tetramethylene glycol, polytetramethylene glycol, 1,6-hexanediol, neopentyl glycol, 1,4-cyclohexanedimethanol, 3-methyl-1,5-pentanediol, 1,9-nonanediol, or 2-methyl-1,8-octanediol.

The polyurethanes of the invention may be used as homopolymers or copolymers, preferably as copolymers with polyesters, polyethers, or polycarbonates. These preferred copolymers are polyurethanes where polyurethane units and polyester units, polyether units or polycarbonate units are jointly present in the polymer chain, either in blocks as block copolymers, in an alternating arrangement, or in a random arrangement. Polyurethane units and polyester units may be linked, for example, via free hydroxy groups of a polyol component of a polyurethane or polyester, which may react with an isocyanate group or with a carboxyl group.

Polyesters are known to those skilled in the art, they may be made by polycondensation of polyols such as the aforementioned alkanediols with bi- or multivalent carboxylic acids. Examples of bi- or multivalent carboxylic acids are phthalic acid, isophthalic acid, terephthalic acid, maleic acid, fumaric acid, adipic acid, and sebacic acid.

Polyethers are basically known to those skilled in the art, they include, for instance, polyether polyols which include ethyleneoxy units or polypropyleneoxy units.

Polycarbonates are likewise known to those skilled in the art. They may be polycarbonate polyols, which may be created by a reaction of diols such as 1,2-propylene glycol, 1,4-butanediol, or 1,6-hexanediol with diaryl carbonates such as diphenyl carbonates, or phosgene.

In accordance with the invention, polyurethane homopolymers, polyester polyurethanes, polycarbonate polyurethanes, and blends thereof, especially polyester polyurethanes, polycarbonate polyurethanes, and blends thereof are used as binder d).

The amount of the at least one binder d) preferably ranges between 1 and 20 percent by weight in terms of the entire inkjet ink, in particular between 3 and 15 percent by weight in terms of the entire inkjet ink, and especially between 4 and 10 percent by weight in terms of the entire inkjet ink.

The inkjet ink of the invention includes at least one fixing agent c) selected from among multivalent calcium salts. Preferred fixing agents c) include calcium chloride, calcium acetate, calcium nitrate, and mixtures thereof, a particularly preferred fixing agent is calcium chloride.

The inkjet ink of the invention includes the at least one fixing agent c) in an amount of between 0.05 and 5 percent by weight in terms of the entire inkjet ink, preferably between 0.1 and 4 percent by weight in terms of the entire inkjet ink, especially between 0.5 and 3 percent by weight in terms of the entire inkjet ink.

The inkjet ink of the invention includes at least one dispersing agent b). The dispersing agent b) is necessary to ensure sufficient stabilization of the pigment a) in the inkjet ink. In general, the dispersing agents b) have a surfactant-like structure with pigment-affine groups which link up to the pigment particles and thus prevent them from agglomeration. In a preferred embodiment, the at least one dispersing agent b) is selected from among non-ionic and anionic dispersing agents, preferably from non-ionic and weakly anionic dispersing agents. Suitable dispersing agents include both electrostatically stabilizing, i.e. ionic, dispersing agents and sterically stabilizing, i.e. non-ionic, dispersing agents. The at least one dispersing agent b) may, for instance, be a polymer including acrylic acid units or methacrylic acid units.

The acid value of the at least one dispersing agent b) is lower than 20 mg KOH/g in terms of the entire dispersing agent b). In a preferred embodiment, the acid value of the at least one dispersing agent b) is lower than 10 mg KOH/g in terms of the entire dispersing agent b). The acid value may be determined in the same way as indicated in the context of binder d).

The amount of the at least one dispersing agent b) preferably ranges between 0.1 and 10 percent by weight in terms of the entire inkjet ink, especially between 1 and 8 percent by weight in terms of the entire inkjet ink.

The inkjet ink of the invention includes at least one pigment a). The at least one pigment a) acts as a coloring agent and is preferably selected from among white pigments, which advantageously provide a way of printing white primers onto the printing substrate. The white primer may then advantageously be printed on using colored aqueous inkjet inks.

The at least one pigment a) is preferably selected from among inorganic oxides. In a particularly preferred embodiment, it is titanium dioxide. The at least one pigment a) is preferably used in the form of nanoparticles or microparticles. The at least one pigment a) may have a functional surface, for instance with aluminum or inorganic aluminum compounds such as aluminum oxide.

The inkjet ink of the invention preferably includes the at least one pigment a) in an amount ranging between 1 and 30 percent by weight in terms of the entire inkjet ink, in particular between 2 and 20 percent by weight in terms of the entire inkjet ink.

The inkjet ink of the invention includes water e). The amount of water e) in the inkjet ink of the invention is preferably at least 20 percent by weight in terms of the entire inkjet ink, in particular at least 40 percent by weight in terms of the entire inkjet ink, especially at least 50 percent by weight in terms of the entire inkjet ink. In a preferred embodiment, the amount of water e) ranges between 20 and 95 percent by weight in terms of the entire inkjet ink, in particular between 30 and 90 percent by weight in terms of the entire inkjet ink, especially between 50 and 80 percent by weight in terms of the entire inkjet ink.

The inkjet ink of the invention may have further components which are basically known for aqueous inkjet inks. They may include humectants such as ethylene glycol in particular, or 1,3-butanediol, wetting agents such as those including siloxane groups, defoaming agents, buffering fluids, biocides, and the like.

With the objects of the invention in view, there is also provided a printing process which utilizes the inkjet ink of the invention. Accordingly, a further aspect of the invention relates to a printing process comprising the steps of:

i) providing a printing substrate,
ii) printing at least one inkjet ink of the invention onto the printing substrate in an inkjet printing process,
iii) drying the inkjet ink applied in step ii),
iv) printing at least one further inkjet ink in an inkjet printing process onto the inkjet ink that has been dried in step iii),
v) drying the inkjet ink that has been applied in step iv).

The inkjet inks of the invention indicated in step ii) are preferably the preferred inkjet inks of the invention that have been indicated above.

The further inkjet inks indicated in step iv) are preferably water-based inkjet inks, in particular inks which have a water content of at least 20 percent by weight in terms of the entire inkjet ink and substantially dry by evaporation of the water.

In a preferred embodiment, the drying in steps iii) and v) is achieved by heating, for example under the influence of IR radiation of an infrared drier in an inkjet printing machine. In the process of drying aqueous inkjet inks, the water contained in the ink is substantially removed in its entirety, resulting in dried inkjet ink.

In a further preferred embodiment, the printing substrate has a water absorption capacity of less than 10 g water/kg of printing substrate, in particular of less than 5 g water/kg of printing substrate, and especially of less than 1 g water/kg of printing substrate.

Preferred printing substrates include plastics such as polyethylene, polypropylene, or polyethylene terephthalate, which may in particular be in the form of a web of foil or in the form of labels to be printed on in the inkjet printing machine. Preferred printing substrates have at least a surface which has a low water absorption capacity of less than 10 g water/kg of surface material, preferably of less than 5 g water/kg of surface material, especially of less than 1 g water/kg of surface material. They may, for example, be plastic surfaces, metal surfaces, or combinations thereof. In a particularly preferred embodiment, the printing substrate is paper or cardboard coated with a plastic and/or metal, for instance plastic foil and/or metallic foil glued thereto.

The inkjet inks of the invention are characterized in that they are easily applied by commercial inkjet printing machines, have high storage stability, adhere to surfaces that do not absorb water, exhibit high resistance to wiping, and are advantageously capable of being overprinted by other water-based inkjet inks.

Other features which are considered as characteristic for the invention are set forth in the appended claims.

Although the invention is described herein as embodied in an aqueous inkjet ink for non-absorbent printing substrates and a printing process, it is nevertheless not intended to be limited to the details provided, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE INVENTION

Utilized Substances

Pigment 1: KRONOS® 2066 95% titanium dioxide)

Pigment 2: TIOXIDE® RDIS (95% titanium dioxide)

Dispersing agent 1: ZETASPERSE® 3800 (polymeric, slightly anionic dispersing agent)

Dispersing agent 2: DISPERBYK-190 (aqueous solution of a high-molecular block copolymer with pigment affine groups, acid value 10 mg KOH/g)

Dispersing agent 3 DISPERBYK-2010 (aqueous emulsion of a structured acrylate polymer with pigment affine groups)

Fixing agent 1: calcium chloride

Binder 1: PrintRite DP 380

Binder 2: PrintRite DP 375 (aqueous polyurethane dispersion with a solid proportion of 30 to 34%, pH value from 4 to 8)

Binder 3: XW-UM3

Binder 4: NeoRez® R-9340 (aqueous non-ionic polyester urethane dispersion with a solid proportion of 40%, pH value of 6.8)

Binder 5: NeoRez® D-2301

Binder 6: Takelac W-6355 (aqueous polycarbonate polyurethane dispersion)

Binder 7: Lupasol® PN 60 (modified polyethylenimine) (COMPARISON)

Binder 8: Antara 430 (styrene N-vinylpyrrolidone copolymer) (COMPARISON)

Binder 9: Luviskol® VA73W (vinylpyrrolidone vinyl alcohol copolymer) (COMPARISON)

Wetting agent 1: TEGO® Twin 4000 (siloxane-based wetting agent)

Wetting agent 2: TEGO® Twin 4100 (siloxane-based wetting agent)

Wetting agent 3: TEGO® Twin 4200 (siloxane-based wetting agent)

Wetting agent 4: TEGO® Wet 280 (siloxane-based wetting agent)

Wetting agent 5: TRITON HW-1000 (non-ionic wetting agent)

Defoaming agent 1: SURFYNOL® ADO1

Humectant 1: ethylene glycol

Humectant 2: 1,3-butanediol

General Methodology

Pigment, dispersing agent, defoaming agent, and water were combined and mixed with a mixer of a high shear force. The mixing continued until no reduction in particle size occurred any longer. Then fixing agent, binder, wetting agent, and humectant were added and mixed again with the mixer of a high shear force until the mixture was homogeneous.

Viscosity was measured at 25° C. each time by using a cone plate viscometer, based on DIN ISO 3219.

Redispersibility of the sediments was measured by rolling the sample container for five minutes at room temperature.

Particle size was measured by using dynamic light scattering.

Measurements on Storage Stability

Redispersibility of the sediments was measured after a test period of 28 days at 60° C. in a temperature-control cabinet. Only total redispersibility was acceptable.

Changes in viscosity, pH value, and particle size were likewise measured after a 28-day test period at 60° C. in a temperature-control cabinet using the measuring methods described above. Viscosity changes of up to ±1 mPa·s were acceptable. pH value changes of up to −1 were acceptable. Particle size changes of not more than ±80 nm were acceptable.

Example 1

15 percent by weight of pigment 1
1.5 percent by weight of dispersing agent 1
1 percent by weight of fixing agent 1
5 percent by weight of binder 1
1 percent by weight of wetting agent 1
0.25 percent by weight of defoaming agent 1
10 percent by weight of humectant 1
66.25 percent by weight of water
Viscosity: 3.1 mPa·s
pH value: 8.1
Change in viscosity after test period: +0.4 mPa·s
Change in pH value after test period: −0.1
Sediments redispersible after test period: yes
Change in particle size after test period: acceptable

Example 2

15 percent by weight of pigment 1
1.5 percent by weight of dispersing agent 1
1 percent by weight of fixing agent 1
5 percent by weight of binder 1
1 percent by weight of binder 2
0.25 percent by weight of defoaming agent 1
10 percent by weight of humectant 1
66.25 percent by weight of water
Viscosity: 2.7 mPa·s
pH value: 8.2
Change in viscosity after test period: +0.4 mPa·s Change in pH value after test period: −0.1
Sediments redispersible after test period: yes
Change in particle size after test period: acceptable

Example 3

15 percent by weight of pigment 1
1.5 percent by weight of dispersing agent 1
1 percent by weight of fixing agent 1
5 percent by weight of binder 1
1 percent by weight of wetting agent 3
0.25 percent by weight of defoaming agent 1
10 percent by weight of humectant 1
66.25 percent by weight of water
viscosity: 2.9 mPa·s
pH value: 8.1
Change in viscosity after test period: 0 mPa·s
Change in pH value after test period: 0
Sediments redispersible after test period: yes
Change in particle size after test period: acceptable

Example 4

15 percent by weight of pigment 1
1.5 percent by weight of dispersing agent 1
1 percent by weight of fixing agent 1
5 percent by weight of binder 1
1 percent by weight of wetting agent 4
0.25 percent by weight of defoaming agent
10 percent by weight of humectant 1
66.25 percent by weight of water
Viscosity: 2.9 mPa·s
pH value: 8.3
Change in viscosity after test period: +0.2 mPa·s
Change in pH value after test period: −0.1
Sediments redispersible after test period: yes
Change in particle size after test period: acceptable

Example 5

15 percent by weight of pigment 2
1.5 percent by weight of dispersing agent 1
1 percent by weight of fixing agent 1
5 percent by weight of binder 4
0.25 percent by weight of defoaming agent 1
10 percent by weight of humectant 2
67.25 percent by weight of water
Viscosity: not determined
pH value: 8.5
Change in viscosity after test period: not determined
Change of ph value after test period: −0.8
Sediments redispersible after test period: yes
Change in particle size after test period: acceptable

Example 6

15 percent by weight of pigment 2
1.5 percent by weight of dispersing agent 3
1 percent by weight of fixing agent 1
5 percent by weight of binder 2
0.25 percent by weight of binder 1
5 percent by weight of humectant 1
72.25 percent by weight of water
Viscosity: 4.5 mPa·s
pH value: 8.1
Change in viscosity after test period: 0 mPa·s
Change in pH value after test period: −1

Sediments redispersible after test period: yes
Change in particle size after test period: acceptable

Example 7

15 percent by weight of pigment 1
1.5 percent by weight of dispersing agent 2
1 percent by weight of fixing agent 1
5 percent by weight of binder 5
0.25 percent by weight of defoaming agent 1
5 percent by weight of humectant 1
72.25 percent by weight of water
Viscosity: 3.5 mPa·s
pH value: 8.7
Change in viscosity after test period: 0 mPa·s
Change in pH value after test period: −0.6
Sediments redispersible after test period: yes
Change in particle size after test period: acceptable

Example 8

15 percent by weight of pigment 1
1.2 percent by weight of dispersing agent 1
1 percent by weight of fixing agent 1
5 percent by weight of binder 3
1 percent by weight of wetting agent 5
0.25 percent by weight of defoaming agent 1
10 percent by weight of humectant 1
66.55 percent by weight of water
Viscosity: 2.3 mPa·s
pH value: 8.1
Change in viscosity after test period: +0.1 mPa·s
Change in pH value after test period: −0.2
Sediments redispersible after test period: yes
Change in particle size after test period: acceptable

Example 9

15 percent by weight of pigment 2
1.2 percent by weight of dispersing agent 1
1 percent by weight of fixing agent 1
5 percent by weight of binder 6
3 percent by weight of wetting agent 5
0.25 percent by weight of defoaming agent 1
10 percent by weight of humectant 1
64.55 percent by weight of water
Viscosity: 5.1 mPa·s
pH value: 8.1
Change in viscosity after test period: not determined
Change in pH value after test period: —0.3
Sediments redispersible after test period: yes
Change in particle size after test period: acceptable

Comparative Example 1

15 percent by weight of pigment 1
1.5 percent by weight of dispersing agent 1
1 percent by weight of fixing agent 1
5 percent by weight of binder 8
0.25 percent by weight of defoaming agent 1
10 percent by weight of humectant 1
67.25 percent by weight of water
Viscosity: 11.6 mPa·s
pH value: 8.4
Change in viscosity after test period: +12.9 mPa·s
Change in pH value after test period: −0.3
Sediments redispersible after test period: no sediments

Change in particle size after test period: polydisperse mix

Comparative Example 2

15 percent by weight of pigment 2
1.5 percent by weight of dispersing agent 2
5 percent by weight of binder 7
5 percent by weight of binder 3
0.25 percent by weight of defoaming agent 1
10 percent by weight of humectant 1
63.25 percent by weight of water
Viscosity: 8.5 mPa·s
pH value: 8.2
Change in viscosity after test period: −0.8 mPa·s
Change in pH value after test period: −0.4
Sediments after test period redispersible: yes
Change in particle size after test period: inacceptable

Comparative Example 3

15 percent by weight of pigment 1
1.2 percent by weight of dispersing agent 1
1 percent by weight of fixing agent 1
5 percent by weight of binder 9
0.25 percent by weight of defoaming agent
10 percent by weight of humectant 1
67.55 percent by weight of water
Viscosity: 5 mPa·s
pH value: 8.4
Change in viscosity after test period: +3.2 mPa·s
Change in pH value after test period: −2.1
Sediments redispersible after test period: yes
Change in particles size after test period: unacceptable

The invention claimed is:

1. An inkjet ink, comprising:
   a) at least one pigment;
   b) at least one dispersing agent having an acid value of less than 20 mg KOH/g relative to an entirety of said at least one dispersing agent;
   c) at least one fixing agent selected from multivalent calcium salts, an amount of said at least one fixing agent ranging between 0.05 and 5 percent by weight relative to an entirety of the inkjet ink;
   d) at least one binder selected from polyurethanes with an acid value of less than 20 mg KOH/g relative to an entirety of the at least one binder; and
   e) water;
   the inkjet ink having a viscosity of less than 30 mPa·s as measured by a cone plate viscometer at 25° C.

2. The inkjet ink according to claim 1, wherein the inkjet ink has a viscosity of less than 20 mPa·s as measured by a cone plate viscometer at 25° C.

3. The inkjet ink according to claim 1, wherein the inkjet ink has a viscosity of less than 10 mPa·s as measured by a cone plate viscometer at 25° C.

4. The inkjet ink according to claim 1, wherein said at least one binder is selected from non-ionic and anionic polyurethanes.

5. The inkjet ink according to claim 1, wherein said at least one fixing agent is selected from calcium chloride, calcium acetate, calcium nitrate, and mixtures of calcium chloride, calcium acetate and calcium nitrate.

6. The inkjet ink according to claim 5, wherein said at least one fixing agent is calcium chloride.

7. The inkjet ink according to claim 1, wherein an amount of said at least one binder ranges between 1 and 20 percent by weight relative to an entirety of the inkjet ink.

8. The inkjet ink according to claim 1, wherein an amount of said at least one dispersing agent ranges between 0.1 and 10 percent by weight relative to an entirety of the inkjet ink.

9. The inkjet ink according to claim 1, wherein an amount of said at least one pigment ranges between 1 and 30 percent by weight relative to an entirety of the inkjet ink.

10. The inkjet ink according to claim 1, wherein said at least one pigment is selected from white pigments.

11. The inkjet ink according to claim 1, wherein an amount of the water ranges between 30 and 90 percent by weight relative to an entirety of the inkjet ink.

12. A printing process, comprising:

i) providing a printing substrate;

ii) printing at least one inkjet ink according to claim 1 onto the printing substrate in an inkjet printing process;

iii) drying the inkjet ink printed in step ii);

iv) printing at least one further inkjet ink in an inkjet printing process onto the inkjet ink dried in step iii); and v) drying the inkjet ink printed in step iv).

13. The printing process according to claim 12, which further comprises carrying out the drying in steps iii) and v) by heating.

14. The printing process according to claim 12, which further comprises providing the printing substrate with a water absorption capacity of less than 10 g of water per kg of printing substrate.

15. The printing process according to claim 12, which further comprises carrying out step ii) by printing on a plastic surface, a metal surface, or combinations of a plastic surface and a metal surface.

\*    \*    \*    \*    \*